United States Patent [19]

Kitagawa et al.

[11] 4,287,317

[45] Sep. 1, 1981

[54] CONTINUOUS PROCESS FOR PRODUCING RUBBER-MODIFIED METHYL METHACRYLATE SYRUPS

[75] Inventors: Yoshihiko Kitagawa, Toyonaka; Yoshimi Hanamura, Niihama; Masahiro Yuyama, Niihama; Masahiko Moritani, Niihama; Akira Sakuramoto, Niihama; Mikio Suzuki, Niihama, all of Japan

[73] Assignee: Sumitomo Chemical Company, Limited, Osaka, Japan

[21] Appl. No.: 142,638

[22] Filed: Apr. 22, 1980

[30] Foreign Application Priority Data

Apr. 27, 1979 [JP] Japan ................... 54-52972

[51] Int. Cl.[3] ............... C08F 255/06; C08F 263/04; C08F 265/06; C08F 279/02
[52] U.S. Cl. .................. 525/309; 525/440; 525/455; 525/290; 525/289; 525/310
[58] Field of Search .............. 525/309, 310, 289, 290, 525/440, 455

[56] References Cited

U.S. PATENT DOCUMENTS

| | | | |
|---|---|---|---|
| 3,234,303 | 2/1966 | Bild et al. ............................. | 525/310 |
| 3,474,081 | 10/1969 | Bosworth ............................ | 260/89.5 |
| 3,511,895 | 5/1970 | Kydonieus ........................... | 260/876 |
| 3,637,545 | 1/1972 | Fivel .................................... | 525/310 |
| 3,658,946 | 4/1972 | Bronstert et al. ................. | 260/878 R |
| 3,671,608 | 6/1972 | Meredith ............................. | 525/310 |
| 3,883,616 | 5/1975 | Hozumi et al. ..................... | 260/880 |
| 4,046,850 | 9/1977 | Kato et al. ........................... | 264/216 |

FOREIGN PATENT DOCUMENTS 937215 9/1963 United Kingdom .

Primary Examiner—Carman J. Seccuro
Attorney, Agent, or Firm—Birch, Stewart, Kolasch & Birch

[57] ABSTRACT

A continuous process for producing rubber-modified methyl methacrylate syrups which comprises continuously supplying a material liquor comprising 1 to 20 parts by weight of a rubbery polymer dissolved in 100 parts by weight of a monomer comprising 60 to 100% by weight of methyl methacrylate, and a radical-polymerization initiator to the first reaction zone, continuously polymerizing at such a stationary conversion that the rubber polymer is dispersed in the form of particles form while maintaining the temperature and residence time in the zone so that a steady state is achieved in the zone and the steady-state concentration of the initiator in the zone is $\frac{1}{2}$ to 1/1,000 time as much as the concentration of initiator supplied, continuously taking out the resulting reaction mixture from the zone, and passing it through the second reaction zone having a volume of 0 to 5 times as much as that of the first reaction zone, to obtain a stable syrup comprising a disperse phase and a continuous phase, the former phase being substantially a solution of the rubbery polymer in the monomer and the latter one being substantially a solution of the resinous polymer in the monomer, and a process for the production of methyl methacrylate cast sheets and molding materials having an excellent impact resistance from the syrups.

10 Claims, No Drawings

CONTINUOUS PROCESS FOR PRODUCING RUBBER-MODIFIED METHYL METHACRYLATE SYRUPS

The present invention relates to a process for producing rubber-modified methyl methacrylate syrups suitable for producing methyl methacrylate cast sheets or molding materials superior in impact resistance.

More particularly, the present invention relates to a continuous bulk polymerization process which comprises continuously polymerizing a solution of a rubbery polymer in a methyl methacrylate monomer, and a radical-polymerization initiator under specified reaction conditions, by which there can stably be obtained a pre-polymer syrup having a high polymer content, said syrup containing the rubbery polymer in the form of stably dispersed particles and having a good storage stability and a moderate viscosity suitable for operation.

The pre-polymer syrup produced by the present process is widely used for various purposes, for instance, as a casting liquid for producing cast sheets or glass fiber-reinforced cast sheets, as an intermediate material for producing molding materials by suspension polymerization or by vaporization-removal of unreacted monomers, as a major component of polymerizable adhesives or paints, or as a starting material for polymer-containing compositions such as resin-concrete compositions. Particularly, the syrup of the present invention is suitable as a material for producing methyl methacrylate cast sheets having an excellent impact resistance by the continuous process or cell cast process, and as an intermediate material for producing methyl methacrylate resin molding materials having an excellent impact resistance by the suspension polymerization.

In order to give impact resistance to methyl methacrylate polymers, it has been proposed to incorporate a rubbery polymer thereto. For instance, there are known a method comprising blending the methyl methacrylate polymer with a rubbery polymer such as polybutadiene, butadiene/methyl methacrylate copolymer, rubbery polyalkyl acrylate or ethylene/vinyl acetate copolymer (cf. Japanese Patent Publication Nos. 11069/1964, 17806/1968, 17808/1968), and a grafting method or grafting/blending method, which comprises emulsion-polymerizing a methyl methacrylate monomer in the presence of the above-mentioned rubbery polymer to obtain a graft copolymer (cf. Japanese Patent Publication Nos. 13266/1965, 26111/1970, 9740/1972). These known methods, however, have drawbacks as described below. That is, when the rubbery polymer is of a diene type, the obtained polymer shows poor weather resistance, and decreases markedly in its impact resistance and further easily colors with the lapse of time. Besides, when the rubber polymer is of a saturated type, it is difficult to obtain a polymer having a satisfactory impact resistance, and further, the polymer shows sometimes insufficient weather resistance and decreases the impact resistance and easily suffers from blushing when used.

Furthermore, it is also known that the impact resistance of some thermoplastic resins can be improved by means of rubbery polymers. Such thermoplastic resins having an improved impact resistance are, for example, ABS resins and high impact polystyrenes. These thermoplastic resins are usually produced by emulsion polymerization, suspension polymerization, bulk polymerization, or a combination of these polymerization methods. Among these, the bulk polymerization is advantageous because it is simple in operation and can give the final product which is not contaminated much with impurities such as an emulsifier. Particularly, since a continuous bulk polymerization is favorable for commercial-scale production in terms of the control of quality of the product and elevation of productivity, various studies have been done on the continuous bulk polymerization. These impact-resistant resins are produced by polymerizing a monomer in which a rubbery polymer is dissolved, that is, by grafting a monomer (e.g. styrene, acrylonitrile) upon the rubbery polymer. Generally, it is known that, in order to improve the impact resistance of resins by reinforcement with rubber, the rubbery polymer should be dispersed in the particle form in resinous polymers, and that, in the bulk polymerization of a uniform monomer solution containing a dissolved rubbery polymer, the solution causes phase separation with the progress of polymerization and, when a certain conversion is exceeded, it causes phase inversion to form a particle-like disperse phase. The shape and size of the dispersed rubbery polymer particles affect the physical properties of final resins such as impact resistance, processability and luster. Consequently, the state of the dispersed particles is regulated in various ways, for example, by dividing the process into many steps, varying the shear stress of stirring or carrying out the phase inversion in different ways (cf. Japanese Patent Publication Nos. 48515/1972, 7343/1974, 38110/1974, 29793/1977, U.S. Pat. Nos. 3,511,895 and 3,658,946). Further, it is well known that, in order to decrease the drawbacks of bulk polymerization (that is, difficulty in the handling of highly viscous liquors), The reaction solution after phase inversion is transferred to an aqueous suspension system followed by completion of polymerization (cf. Japanese Patent Publication Nos. 6977/1962, 29353/1977, U.S. Pat. Nos. 3,883,616). Recently, it is reported that the phenomena of phase separation and phase inversion are also observed in the bulk polymerization of a styrene/methyl methacrylate mixture containing dissolved styrene/butadiene rubber [cf. Jounal of Polymer Science, Vol. 16, pages 337–342 (1978)].

In the light of the above-mentioned prior art, it may easily be thought of that the impact resistance of the methyl methacrylate resins containing methyl methacrylate as the major component can also be improved by such known methods. Nevertheless, it has never been reported that the production of methyl methacrylate resins having an improved impact resistance could be succeeded, because of the difficulty inherent to the bulk polymerization of methyl methacrylate monomers.

What time the phase inversion occurs depends mainly upon the volume ratio of the monomer solution containing dissolved resinous polymer to that containing dissolved rubbery polymer. In general, the phase inversion occurs at a high level of conversion when the content of rubber polymer is high, while it occurs at a low level of conversion when the content is low. In other words, the conversion at which the phase inversion occurs is almost determined by the composition of the material liquor, and therefore when the content of rubbery polymer in the material liquor is increased in order to obtain satisfactory impact resistance, the polymerization should be carried out so as to reach a high level of conversion.

Methyl methacrylate cast sheets have hitherto been produced by a cell cast method using two pieces of reinforced glass plate, but recently a continuous cast method, in which polymerization is carried out between two pieces of endless belt substantially horizontally set up with one upon the other, is developed for industrialization. This continuous method, however, requires a high equipment cost, so that polymerization techniques of high efficiency are required so as to complete the polymerization within a short time. In order to shorten the polymerization time, it is usual to increase the conversion of syrups to be injected. In this case, however, the following many drawbacks appear. The cast sheet foams during the polymerization or when heated for processing. Moreover, the range of processing temperature is narrow, and the solvent resistance becomes poor. Consequently, it is desirable to increase the conversion as much as possible without lowering these qualities. Also, the viscosity of syrup at a constant temperature is generally determined by the polymer content of the syrup and the weight average polymerization degree of the polymer, and it becomes high with an increase in any one of them. Lower values of weight average polymerization degree are, therefore, desirable in order to obtain the highest possible polymer content while keeping the viscosity of syrup below the upper limit determined by operability in injection and the like. On the other hand, lowering of the quality described above depends greatly upon the presence of low molecular weight polymers in the syrup, and the amount of such polymers is almost determined by number average polymerization degree. Consequently, higher values of number average polymerization degree are desirable. In other words, it may be desirable that the range of the distribution of polymerization degree, i.e. a ratio of weight average polymerization degree to number average polymerization degree, is lower. For example, in case of a syrup havng a polymer content of 25% by weight and a number average polymerization degree of 600, the viscosity of the syrup markedly varies with variation of the ratio as follows: 5, 10 and 20 poises in case of the ratio of weight average polymerization degree to the number average one being 2.0, 2.5 and 3.0, respectively. Although syrups containing a rubbery polymer form a heterogeneous system, their viscosity is mainly determined by the viscosity of the continuous phase comprising substantially a monomer solution containing dissolved resinous polymers. As a result, it is desirable that the distribution of polymerization degree of the resinous polymers is in narrower range. Besides, when the syrup contains a high concentration of residual initiator, polymerization further proceeds during cooling step in the syrup production or during storage of syrup, which causes increase of the polymer content and of viscosity of the syrup. As a result, it is difficult to obtain products of constant quality. Furthermore, the residual initiator causes, even in such a trace amount that the progress of polymerization is not substantially observed, deterioration in quality of the syrup during the storage thereof, and hence, when cast sheets or molding materials are prepared from such a syrup, it results in lowering of quality of the products. For example, the sheets or materials contain a large amount of residual monomer and easily foam on processing. Consequently, the concentration of residual initiator should be as small as possible.

As is well known, in the bulk polymerization of methyl methacrylate, the phenomenon that the rate of polymerization is accelerated, being called the gel effect or Trommosdorff effect, is far more remarkable than in the case of styrene or vinyl acetate. It is therefore very difficult to obtain syrups of a high conversion by prepolymerizing a methyl methacrylate monomer. Various improvement have been proposed in order to dissolve this problem. For example, Japanese Patent Publication No. 4794/1963 (British Pat. No. 937,215) discloses a method for obtaining a syrup having a polymer content of 20 to 60% by carrying out the so-called dead-end type polymerization at a temperature high enough for shortening the half-life period of an initiator using a tower type stirring reactor in which a piston flow is substantially achieved. Further, Japanese Patent Publication No. 35307/1972 (U.S. Pat. No. 3,474,081) discloses a method for obtaining a syrup having a polymer content of 15 to 50% by weight and a relatively low viscosity suitable for casting by continuous polymerization using at least two stirring vessels in which complete mixing is substantially achieved.

However, the above-mentioned methods make no reference to reaction in a heterogeneous system containing rubbery polymers. When the former method is applied to such a heterogeneous containing rubbery polymers, phase inversion of the continuous phase and the disperse phase occurs at a certain level of conversion, like the batch-wise polymerization, and therefore, the shape and size of the dispersed rubbery polymer are hardly controlled, and the distrubution of polymerization degree is also undesirably extended to a wide range. On the other hand, when the latter method is applied to the same heterogeneous system, there is little problem in controlling the dispersed particles, but, this method necessarily gives the resinous polymer composed of a large amount of low molecular weight polymers, and hence, when cast sheets or molding materials are produced from this syrup, lowering in quality of the product is not avoidable. Consequently, both methods above-mentioned are still not satisfactory.

Based on the prior knowledge as mentioned above, the present inventors have extensively studies to obtain methyl methacrylate syrups suitable for the production of methyl methacrylate cast sheets or molding materials having an excellent impact resistance. As a result, it has been found that the desired syrups containing the rubbery polymer in the form of stably dispersed particles and having a moderate viscosity suitable for processing and a high polymer content can stably be produced by continuously polymerizing a solution of a rubbery polymer in methyl methacrylate monomer in the presence of a radical polymerization initiator under specified reaction conditions, and further that the desired methacrylic resins having an improved impact resistance can be produced from the syrups thus obtained within a shortened polymerization period of time and without lowering of the qualities which are inherently given by the methacrylate resins by completing the polymerization of the syrup with addition of a radical polymerization initiator by means of the continuous cast method, cell cast method or suspension method.

An object of the present invention is to provide a process for producing rubber-modified methyl methacrylate syrups which are suitable for the production of methyl methacrylate cast sheets or molding materials having an excellent impact resistance. Another object of the invention is to provide a continuous process for the production of methyl methacrylate cast sheets having an excellent impact resistance. A further object of the invention is to provide a process for the production of methyl methacrylate molding materials having an excellent impact resistance. These and other objects and advantages of the present invention will be apparent to persons skilled in the art from the following description.

According to the present invention, the desired rubber-modified methyl methacrylate syrups can continuously be produced by continuous polymerization, which comprises continuously supplying a material liquor comprising 1 to 20 parts by weight, preferably 2 to 10 parts by weight, of a rubber polymer dissolved in 100 parts by weight of a monomer comprising 60 to 100% by weight, preferably 80 to 100% by weight methyl methacrylate and 0 to 40% by weight, preferably 0 to 20% by weight, of an ethylenically unsaturated monomer copolymerizable with methyl methacrylate, and a radical-polymerization initiator, to the first reaction zone wherein the starting materials are substantially completely mixed, and continuously polymerizing the mixture at such a stationary conversion that the rubbery polymer is dispersed in the form of particles of, perferably, 0.1 to 20μ in average particle size, while maintaining the temperature and residence time in the reaction zone so that a steady state is achieved in the zone and the steady-state concentration of the initiator in the polymerization mixture (calculated based on the total weight of the reaction mixture), is ½ to 1/1,000 time, preferably 1/5 to 1/500 time, as much as the concentration of the initiator supplied (calculated on the total amount of the monomer and initiator supplied continuously), and taking out the resulting reaction mixture from the first reaction zone and passing it through the second reaction zone having a volume of 0 to 5 time, preferably 0.01 to 5 times, more preferably 0.02 to 0.5 time, most preferably 0.05 to 0.2 time, as much as that of the first reaction zone, in said second reaction zone a piston flow being substantially achieved, and thereby the final concentration of the initiator is decreased to preferably 1 ppm or less while keeping the dispersion state of the particles (wherein when the second reaction zone has a volume of zero time as much as that of the first reaction zone, it means that the second reaction zone is not used). The syrup thus obtained comprises a dispersion phase (a solution of a major amount of the rubbery polymer and a minor amount of the resinous polymer in the monomer) having an average particle size of 0.1 to 20μ, preferably 0.2 to 10μ, and a continuous phase (a solution of a major amount of the resinous polymer having a number average polymerization degree of 300 to 6,000, preferably 400 to 2,000, and a minor amount of the rubbery polymer in the monomer) and has a conversion of 5 to 40% by weight, preferably 10 to 30% by weight, and a viscosity of 0.5 to 500 poises, preferably 1 to 100 poises at 25° C.

The monomer used for producing the syrup of the present invention is preferably a monomer containing methyl methacrylate as a main component, and comprises methyl methacrylate alone or a monomer mixture of methyl methacrylate and an ethylenically unsaturated monomer copolymerizable therewith of not more than 40% by weight, preferably not more than 20% by weight, based on the total amount of the monomers.

The ethylenically unsaturated monomer copolymerizable with methyl methacrylate includes alkyl or alkenyl acrylates having 1 to 8 carbon atoms in the alkyl or alkenyl moiety which may be substituted with a hydroxy group, such as methyl acrylate, ethyl acrylate, butyl acrylate, 2-ethylhexyl acrylate, 2-hydroxyethyl acrylate, allyl acrylate, and ethylene glycol diacrylate; alkyl or alkenyl methacrylates having 1 to 8 carbon atoms in the alkyl or alkenyl moiety which may be substituted with a hydroxy group, such as ethyl methacrylate, lauryl methacrylate, 2-hydroxyethyl methacrylate, glycidyl methacrylate and ethylene glycol dimethacrylate; unsaturated nitriles such as acrylonitrile and methacrylonitrile; unsaturated amides such as acrylamide and diacetone acrylamide; unsaturated carboxylic acids such as acrylic acid and methacrylic acid; vinyl aromatic compounds such as styrene, α-methylstyrene, nuclear-substituted alkylstyrene (e.g. P-methylstyrene) and nuclear-substituted chlorostyrene (e.g. P-chlorostyrene); and vinyl chloride. These monomers may be used alone or in combination of two or more thereof. The amount of these ethylenically unsaturated monomers is generally limited to the range described above in order to improve the qualitites of methyl methacrylate resins, for example moldability, thermal resistance, solvent resistance and others, without damaging the characteristics of the resins, or to recover transparency damaged by the addition of rubbery polymers.

The rubbery polymer includes homopolymers such as polybutadiene, polyisoprene and polyisobutylene; diene type copolymers such as butadiene/styrene copolymer, butadiene/acrylonitrile copolymer, butadiene/methyl methacrylate copolymer and butadiene/alkyl acrylate copolymer; ethylene/vinyl acetate copolymers; ethylene/alkyl acrylate copolymers (the number of carbons of the alkyl is 1 to 8); rubbery polyalkyl acrylates or copolymers thereof; polyurethanes; chlorinated polyethylenes; and EPDM (ethylene/propylene/diene terpolymers). These polymers may be used alone or in combination of two or more thereof. It is unexpectedly been found that not only the saturated type rubbers but also the diene type rubbers can give an excellent weather resistance and a high impact resistance to the product. The monomer solution containing the rubbery polymer is commonly prepared by dissolving the rubbery polymer in the monomer, and the monomer may be in the form of syrups, that is, in the form of partially pre-polymerized products of the monomer. In some cases, the monomer solution may be prepared by extracting a rubbery polymer from latex of the rubbery polymer with a monomer, as used for suspension polymerization. The amount of rubbery polymer added is within the range of 1 to 20 parts by weight, preferably 2 to 10 parts by weight, based on 100 parts by weight of the monomer. When the amount is below this range, the effect of the polymer to give impact resistance is low, while when the amount is above this range, the thermal properties and weather resistance of methyl methacrylate resins are damaged.

The radical-polymerization initiator used in the present invention include those which generate radicals relatively rapidly at 90° to 200° C., preferably 110° to 180° C.

Suitable initiators show a half-life period of 5 seconds or less at 180° C. or lower, preferably 140° C. or lower. Suitable examples of these initiators are azo compounds such as azobisisobutyronitrile, azobis-2,4-dimethylvaleronitrile, azobis-(4-methoxy-2,4-dimethylvaleronitrile) and azobiscyclohexanecarbonitrile; and peroxides such as benzoyl peroxide, lauroyl peroxide, decanoyl peroxide, acetyl peroxide, isobutanoyl peroxide, capryl peroxide, 2,4-dichlorobenzoyl peroxide, acetylcyclohexylsulfonyl peroxide, tert-butyl peroxypivalate, tert-butyl peroxy-2-ethylhexanoate, isopropyl peroxydicarbonate, isobutyl peroxydicarbonate, sec-butyl peroxyidicarbonate, n-butyl peroxydicarbonate, 2-ethylhexyl peroxydicarbonate, dicyclohexyl peroxydicarbonate, bis-(4-tert-butylcyclohexyl) peroxydicarbonate, diethoxyethyl peroxydicarbonate, di-n-butoxyethyl peroxydicarbonate, and di-3-methoxybutyl peroxydicarbonate. These initiators may be used alone or in combination of two or more thereof. It has unexpectedly been found that even the azo type initiators, which are said to be poor in an ability to promote graft polymerization, have functions to form a stable disperse phase of rubbery polymers and to give an excellent impact resistance to the resin products like the peroxide type initiators. Of these initiators, those of which the half-life period is 5 seconds or less at 140° C. or lower are particularly desirable for the following reasons: Polymerization can be carried out operationally stably at such a low temperature as 90° to 160° C., preferably 110° to 160° C., so that load for pre-heating the monomer and cooling the syrup is lightened, pressure condition is relieved, and besides formation of dimers as by-product in the syrup and coloration are restricted. The initiator is usually used in an amount of 0.001 to 1 part by weight, preferably 0.01 to 0.5 part by weight, based on 100 parts by weight of the total monomer. When a high conversion or a high graft percentage is desired, the initiator is supplied in a high concentration, but on the other hand, when high number average polymerization degree of a high viscosity is desired, the initiator is supplied in a low concentration. Further, the concentration of initiator supplied affects the particle size of dispersed rubbery polymers, and hence, the concentration of initiator supplied should be controlled under taking into account the desired average particle size.

In the production of the syrup according to the present invention, any chain transfer agent is usually not used, because the conversion and the viscosity of the syrup and the dispersion state of rubbery polymers can easily be controlled as desired by merely controlling the reaction temperature, concentration of initiator supplied and average residence time of reaction mixture. But the agent may be used so far as it does not lower the quality of the syrup or resin product.

The methyl methacrylate monomer, rubbery polymer and radical-polymerization initiator are continuously supplied to the first reaction zone in which they are substantially completely mixed. Since complete mixing is maintained in the zone, the distribution of polymerization degree of the produced resinous polymer can be made very narrow. Consequently, the ratio of the weight average polymerization degree to the number average polymerization degree of the whole polymers including the rubbery polymer dissolved in solution in the continuous phase can be made 3 or less, preferably 2.5 or less. The reaction temperature and average residence time in the zone are maintained so that the steady-state concentration of initiator is $\frac{1}{2}$ to 1/1,000 time, preferably 1/5 to 1/500 time, as much as the concentration of initiator supplied. When the steady-state concentration is above this range, operation in the zone becomes thermally unstable, and hence, the amount of polymer produced in the zone should be limited to a very low level in order to ensure stable stationary operation. As a result, it becomes impossibe to effect sufficient phase inversion of the material liquor containing the rubbery polymer in an amount enough for giving an excellent to the products. On the other hand, when said concentration of initiator supplied is below the above-mentioned range, the supplied initiator decomposes before it is incorporated sufficiently uniformly in the reaction mixture so that complete mixing is not substantially achieved. As a result, the produced resinous polymer itself has a broad distribution of polymerization degree, and therefore the distribution of polymerization degree of the whole polymers in the continuous phase becomes also broad, and the vicosity of the syrup becomes too high for conversion.

In the method of the present invention, the temperature of the first reaction zone is not particularly limited, but it is generally kept at 90° to 200° C., preferably 110° to 180° C. Suitable temperature depends upon the decomposition temperature of initiator and it is controlled so that the ratio of the concentration of initiator in the polymerization mixture to that of initiator supplied is within the range mentioned hereinbefore. When the temperature is below this range, the reaction zone becomes easily unstable in terms of concentration, and the graft polymerization does not proceed sufficiently. Consequently, the dispersion stability of rubbery polymer particles in the syrup is poor, and the dispersed particles separate from the resin product with the lapse of time, which causes blushing of the product. On the other hand, when the temperature is above this range, the amount of by-products such as dimer increases, and some kinds of rubbery polymer cause coloration and decomposition which induces lowering of the qualities of the syrup or resin product. The average residence time of the reaction mixture in the zone is controlled, like the concentration of initiator supplied, depending upon the desired conversion and viscosity of the final syrups and the size of the dispersed particles, but it is generally in the range of 0.5 to 30 minutes, preferably 1 to 15 minutes. When the residence time is shorter than the range, the mixing time can not sufficiently be shortened relative to the average residence time, so that complete mixing is not substantially achieved. When the residence time is longer than the above range, the concentration of initiator supplied should undesirably be much decreased in order to obtain the desired conversion, which results in a great increase in viscosity. Besides, when a chain transfer agent is used in order to avoid such an increase in viscosity, the resin product may be colored and a sufficient impact resistance may not given to the product.

The conversion of monomer in the reaction zone is selected from the range of 5 to 40% by weight, preferably 10 to 30% by weight. When the conversion is below this range, it is difficult, as described above, to effect sufficient phase inversion of the material liquor containing the rubbery polymer in an amount enough for giving an excellent impact resistance to the product. On the other hand, when the conversion is above this range, the viscosity of the syrup at room temperature is too high for handling, and besides the reaction becomes unstable in terms of concentration because of the Trommosdorf effect, which makes stable stationary operation practically impossible. A preferred viscosity of the syrup at 25° C. is 0.5 to 500 poises, preferably 1 to 100 poises. When the viscosity is below this range, the syrup leaks when injected into glass cells or between moving bands. When the viscosity is above this range, injection of the syrup is difficult, air bubbles are included in the cast sheet, and when the syrup is used for suspension polymerization, completely spherical beads are hardly formed and the beads sometimes contain aqueous components.

Furthermore, said conversion should be within the range enough to permit the rubbery polymer to form particles and further to permit the monomer solution containing the rubbery polymer to form a stable disperse phase and the monomer solution containing the resinous polymer to form a stable continuous phase. Generally, the conversion is regulated so that the content of resinous polymer is at least equal to, preferably 2 to 10 times, that of the rubbery polymer.

The average particle size of the rubbery polymer is generally 0.1 to 20$\mu$, preferably 0.2 to 10$\mu$. In order to control the average particle size within the desired range, the kind and amount of initiator, reaction temperatre and average residence time are mutually controlled, depending upon the kind of the rubbery polymer, under the foregoing conditions of the steady-state concentration of initiator, conversion and viscosity. In the continuous bulk polymerization according to the present invention, impact resistance is generally high when the average particle size is within the above range, and there is generally a maximum of impact resistance within the above range. When the average particle size is below this range, a sufficient effect to give impact resistance can not be obtained. When the particle size is above this range, the produced cast sheets or molded products show lower tensile strength and marked impact blushing.

The number average polymerization degree of resinous polymers in the continuous phase of the syrup is within a range of 300 to 6,000, preferably 400 to 2,000. When the polymerization degree is below this range, methyl methacrylate resins do not show sufficient mechanical properties. When the polymerization degree is above this range, the viscosity of the syrup becomes undesirably too high relative to conversion.

The temperature of the first reaction zone can favorably be controlled by changing the temperature of the material liquor to be supplied. In addition, it is preferable to circulate a heat transfer medium through a jacket mounted on the outside of the reaction zone. A method for pre-heating the material liquor may be any one of those in which the stagnant flow of the liquor is not substantially present and temperature control is possible. For example, coil-type heat exhangers are preferably used. The initiator may previously be added to the material liquor to be preheated, but it is preferred that only the material liquor, i.e. a monomer solution containing the rubbery polymer, is pre-heated and then supplied, and a monomer solution containing the initiator is supplied without pre-heating. To the material liquor or initiator solution may previously be added one or more additives such as thermal stabilizers, ultraviolet absorbers, coloring agents, plasticizers, release agents and the like, which are used for producing the final products.

Stirring in the first reaction zone should be carried out so that the monomer solution containing the rubbery polymer and the initiator are rapidly incorporated in the reaction mixture to make the temperature of the system substantially uniform, that the phase separation equilibrium is substantially achieved, and further that the particle size of dispersed rubbery polymers reaches a substantial equilibrium value. But, any one of reaction equipments and stirring means may be used, provided that complete mixing can substantially be achieved. Of stirring means, those in which the Reynold's number is not smaller than 2,000, preferably not smaller than 5,000, are used. For example, vessel-type reactors equipped with a double helical ribbon blade, a screw blade with draft tube or stirring blade called MIG type, are preferably used. Anchor blades, paddle blades and turbine blades, which are poor in the replacement ability of fluid elements along the axial direction, are not desirable for the present invention.

The number of reactor in the reaction zone in which complete mixing is substantially achieved, is generally one, but in some cases for the purpose of elevating operation stability to obtain a high conversion, 2 to 3 reactors may be connected in series. In this case, the initiator may or may not be supplied additionally to the second reactor and reactors which follow. In these reactors, the conversion can be elevated by maintaining the specified steady-state concentration of initiator and the dispersion state of rubbery particles.

Next, explanation will be given as to the second reaction zone. The reaction mixture from the first reaction zone may be used, after cooled as usual, as syrups for the production of cast sheets or molding materials. However, in order to further decrease the concentration of initiator remained in the syrup, it is more desirable to connect in series the first reaction zone with the second reaction zone, in which a piston flow is substantially achieved. The phrase "a piston flow is substantially achieved" means that the back-mixing of fluid elements along the flow direction in a reactor is restricted in some ways such as setting restricting plates across the flow direction and enlarging the ratio of length to diameter. During passage through the second zone, the concentration of initiator is markedly decreased with additional formation of a small amount of the desired polymer. The initiator concentration of the final syrup is usually substantially negligibly small, such as 1 ppm or less, particularly 0.1 ppm or less, and therefore, an increase of the conversion and viscosity during cooling is negligibly small. Thus, by passing the reaction mixture through the second reaction zone, syrups thus obtained have a constant quality and excellent storage stability. Accordingly, even when cast sheets are produced from such syrups after storage, there is not observed any quality change of the products, such as increase of the residual monomer content and foaming during thermal processing thereof.

The temperature of the second reaction zone is kept so as to decompose sufficiently rapidly the remaining initiator. Generally, the second reaction zone is kept at a temperature at which the half-life period of initiator is 20 seconds or less, preferably 5 seconds or less, which is equal to or not lower than that of the first reaction zone. The average residence time of the reaction mixture in the second zone is 0 to 5 time, preferably 0.01 to 5 time, more preferably 0.02 to 0.5 time, most preferably 0.05 to 0.2 time, as much as that in the first zone. When the absolute steady-state concentration of initiator in the first zone is sufficiently small, the average residence time in the second zone is on the shorter side of the above range, or the second zone may be omitted (that is, the residence time in the second zone may be zero). When the average residence time is over this range, the viscosity increases undesirably and side reactions easily occur.

Reaction equipments and stirring means in the second zone may be any one of those in which a piston flow is substantially achieved. For example, tubular reactors equipped with a self-wiping type stirrer are preferably used, but pipes leading to the next step, for example, a cooling step, may be used in place of stirring.

The vapor pressure of the reaction mixture is generally larger than atmospheric one in both the first reaction zone and the second one. Consequently, for facilitating the control of residence time and temperature in the both zones and for maintaining the qualities of the final syrup (e.g. polymer content, viscosity and initiator concentration) substantially constant, it is preferred to keep the reaction mixture substantially liquid by applying a pressure higher than the vapor pressure, generally 1 to 20 atm., preferably 2 to 10 atm., to the reaction mixture.

By using the syrups obtained above, there are produced cast sheets, glass fiber-reinforced cast sheets and molding materials having an excellent impact resistance.

For producing impact-resistant methyl methacrylate cast sheets by the continuous cast method, a polymerizable liquid composition is first prepared by dissolving an initiator in the syrup obtained above, and the composition is continuously supplied to space between a pair of moving bands and polymerized by passing it through the hot-water polymerization zone and heat treatment zone together with the moving bands. The initiator used in this method may be the same azo compounds or peroxides as used in producing the syrup. It may be used alone or in combination. The amount of initiator is generally 0.005 to 5% by weight, preferably 0.03 to 2% by weight, based on the weight of the syrup. The temperature of the hot-water polymerization zone depends upon the thickness of cast sheet and the kind and amount of initiator, but preferably it is 60° to 90° C. in general. The temperature of the heat treatment zone also depends upon the same factors as above, but preferably it is 110° to 150° C.

An equipment used for this method is one generally known as a double belt conveyor. As is shown in Japanese Patent Publication No. 29916/1976, the double belt convetor is, for example, composed of a pair of moving endless bands which are set up substantially horizontally with one upon the other and are travelling in the same direction at substantially the same speed, and at least one endless gasket which is set up at each side of the endless bands and is travelling in contact with the both bands, and the conveyor is set to pass through the hot-water polymerization zone and then heat treatment zone. The polymerizable liquid composition is continuously supplied to one end of the space enclosed by the bands and gaskets, is polymerized while the bands pass through the two zones, and is taken out of the other end of the space as polymer sheet. The converyor has two mechanisms, one of which is a mechanism for keeping a distance between the both bands so as to meet the desired thickness of cast sheet, and any other one of which is one for following the volume change of the composition owing to polymerization. For the purpose of preventing the cast sheet from foaming during polymerization, the liquid composition is deaerated under reduced pressure before injection to remove dissolved air. The composition is polymerized until a conversion of 80 to 95% by weight is achieved while passing through the hot-water polymerization zone together with the moving bands, and the completely polymerized in the heat treatment zone. The casting time necessary to obtain high-quality cast sheets showing no foaming during polymerization and having good mechanical properties and no drawbacks such as foaming on heat processing, varies with the kind of initiator, polymerization temperature and thickness of cast sheet. According to the present invention, however, the time is generally 4 to 120 minutes, preferably 5 to 60 minutes. Particularly, when a required thickness is as small as 2 to 3 mm, such a short time as 5 to 30 minutes is sufficient to produce cast sheets having an excellent impact resistance and other superior qualities.

When impact-resistant methyl methacrylate cast sheets are produced by the cell cast method, the conventional techniques can be applied. A typical technique is as follows. A cell is first constructed by placing flexibel gasket, being made of a plasticized polyvinyl chloride composition, between two pieces of reinforced glass plate along the periphery thereof, and clamping the assembly, a polymerizable liquid composition in injected into the cell, polymerized by placing the cell in a water bath or air bath kept at a required temperature, heat-treated in an air bath to complete polymerization, cooled and taken out of the cell as cast sheet. In this technique, when a polymerizable liquid composition produced by dissolving an initiator in the syrup obtained above is used, the desired impact resistance can be given to the cast sheet with having the beautiful appearance and other superior qualities. As to the kind and amount of initiator and the polymerization temperature, the same ranges as described in the continuous cast method are applied. The polymerization temperature is preferably in the range at which the half-life of initiator is as long time as possible within the above range, or longer.

The well-known method and equipment can also be applied, as they are, to the production of glass fiber-reinforced cast sheets using the syrup obtained by the foregoing method. This method comprises impregnating or mixing glass fibers with a polymerizable liquid composition comprising said syrup and an initiator dissolved therein, and casting the composition by heating, followed by heat treatment from completion of polymerization. Casting may be carried out in a mold of a required shape made of glass, cellophane film, polyester film, polyvinyl alchohol film, polyethylene film, polypropylene film, aluminum, iron or stainless steel, or may be carried out between two pieces of continuously moving belt made of stainless steel or the above films. In this way, products of optional shape, for example flat sheets or corrugated sheets, can be obtained. The products thus obtained may further be processed by thermoforming. As to the kind and amount of initiator, those described in the foregoing continuous cast method are desirable. As to the peroxide initiators, redox type ones containing the peroxide as one component may be used. Further, in order to improve the solvent resistance of glass fiber-reinforced cast sheets, polyfunctional unsaturated monomers such as ethylene glycol dimethacrylate, ethylene glycol diacrylate, trimethylolpropane triacrylate and pentaerythritol triacrylate are preferably added as a crosslinking agent. The polymerization temperature and polymerization time are selected according to the foregoing continuous cast method or cell cast method. The glass fibers used in this method are well-known ones, and their form may be any one of roving, surfacing mat, chopped strand, chopped strand mat, satin, checked weave, plain weave, menuki-plain weave, twill elastic webbing and net. Any type of glass fibers such as E-type glass fibers and C-type ones may be used. The weight ratio of glass fiber to polymerizable liquid composition is the same as commonly used, and a preferred amount of glass fiber is generally 10 to 40% by weight based on the weight of cast sheet.

In any one of the foregoing continuous cast method, cell cast method and method for producing glass fiber-reinforced cast sheets, the polymerizable liquid composition may be used in combination with one or more of additives such as thermal stabilizers, ultraviolet absorbers, coloring agents, plasticizers, release agents and fillers.

In the production of methyl methacrylate resin molding materials having an impact resistance by the suspension polymerization, the well-known method can also be applied as it is. This method comprises dispersig a polymerizable liquid composition in an aqueous medium with stirring in the presence of a suspension stabilizer, polymerization-hardening the composition by heating, heat-treating the resulting product in order to complete polymerization, cooling, washing and drying, followed by pelletizing or powdering if necessary. In this method, when a liquid composition produced by dissolving an initiator in the syrup obtained above is used, there can be obtained molding materials suitable for producing molded products having an excellent impact resistance and other superior properties. In order to regulate the molecular weight of the molding materials and improve the processability thereof, 0.01 to 1% by weight of a chain transfer agent is usually added to the polymerizable liquid composition. The chain transter agent includes mercaptans such as n-butyl mercaptan, tertbutyl mercaptan, lauryl mercaptan, thioglycol, thioglycollic acid and its alkyl esters. At this stage, one or more ethylenically unsaturated monomers copolymerizable with methyl methacrylate, which can be used in the foregoing syrup production, may be added. Particularly preferred monomers include alkyl acrylates such as methyl acrylate, ethyl acrylate and butyl acrylate. The suspension stabilizer used in this method is not particularly limited, and includes, for example, polyvinyl alcohol, alkyl cellulose, hydroxyalkyl cellulose, polyacrylic acid, polyacrylamide, sodium polyacrylate and calcium phosphate. In this method, the kind and amount of initiator, polymerization temperature and polymerization time are not particularly limited, but it is desirable that they are within the ranges described in the foregoing continuous cast method and cell cast method. To the molding materials produced by this method may be added one or more additives such as thermal stabilizers, antioxidants, ultraviolet absorbers, coloring agents, plasticizers, release agents and lubricants. These additives may be added during the steps such as pelletizing or molding, or may be added to the polymerizable liquid composition.

Further, for producing impact-resisting molding materials using the syrup obtained by the method of the present invention, there may by applied another method which comprises heating the syrup under pressure, and flushing it through a slit under atmospheric pressure or under reduced pressure, thereby removing unreacted monomers by evaporation, followed by pelletizing or powdering.

The use of the rubber-modified methyl methacrylate syrups produced according to the present invention is not limited to those described above. The syrups can widely be applied to the common usages of a prepolymer syrup, for example, as a main component of polymerizable adhesives of paints, and a material for polymer-containing compositions such as resin concrete compositions.

The present invention will be illustrated specifically with reference to the following examples, but is not limited to these examples. In the examples, all percents and parts are by weight. The viscosity of syrup was measured at 25° C. by means of a B-type viscometer. The conversion was measured by gas chromatography. The foaming of cast sheet on polymerization was evaluated by the visual examination of the presence of foams in the cast sheet. The foaming of cast sheet by heating was evaluated by heating the cast sheet in a circulating hot-air oven at 180° C. for 30 minutes and visually examining the presence of foams in the cast sheet.

The reduced viscosity was obtained by measuring a 0.1 g/dl chloroform solution of the cast sheet or a 1 g/dl chloroform solution of the molding material at 25° C. The content of remaining monomer was obtained by the gas-chromatographic measurement of a methylene chloride solution of the cast sheet or molding material.

Prior to the measurement of the following physical properties, the bead-like molding material was formed into a plate by compression molding at 210° C. The heat distortion temperature of resin was measured according to ASTM-648. For the impact strength, Izod impact values (with notch) were measured according to ASTM D-256. For the weather resistance, the accelerated exposure test was carried out according to ASTM D-1499 using a Sunshine weather meter.

EXAMPLE 1

A 2-stage continuous reaction equipment composed of a front part and a back part was used. In the front part was set up a vessel-type reactor equipped with a double helical ribbon-form stirrer. In the back part was set up a tubular reactor equipped with a stirring shaft to which pins were fixed at a righ angle thereto, similarly pins were fixed to the inside wall of the reactor at a right angle thereto and towards the stirring shaft, and the both pins were arranged so that they could wipe off matters attached to the opposite pins. The stirrers rotated at 800 rpm in both reactors, and the volume ratio of vessel-type reactor to tubular one was 1:0.1. Polybutadiene rubber (Diene ® NF-35A, produced by Asahi Kasei Kogyo Co., 5 parts) was dissolved in methyl methacryalte monomer (90 parts) to obtain a material liquor. The liquor was pre-heated to about 90° C. while being passed through a single tube equipped with a jacket, and continuously supplied to the vessel-type reactor. Separately, a solution (20° C.) of lauroyl peroxide (0.3 part) in methyl methacrylate monomer (10 parts) was continuously supplied to the same reactor. In the vessel-type reactor, polymerization was carried out while maintaining the average residence time of the reaction mixture at 140 seconds, and the resulting reaction mixture was passed through the tubular reactor, whereby reaction was completed so far as polymers in the syrup were concerned. The temperature and pressure in each reactor were 150° C. and 6.0 atm., respectively. At that time, the steady-state concentration of initiator in the vessel-type reactor was 1/40 time as much as the concentration of initiator supplied. The syrup from the tubular reactor had a conversion of 22.3% and a viscosity of 18.4 poises, which was very suitable for operation. The initiator content of the syrup was 0.1 ppm or less, and the syrup showed no change in the conversion and viscosity at all even after it was left at 60° C. for 3 hours. The average particle size of dispersed particles in the syrup was 2.5μ, and no change was observed at all in the dispersion state even after the syrup was left for a long time. The number average polymerization degree and weight average polymerization degree of resinous polymers constituting the continuous phase of the syrup were calculated from the distribution curve of polymerization degree which was obtained by gel permeation chromatography (packed with polystyrene gel; eluent: tetrahydrofuran). As a result, it was found that the number average polymerization degree was 550 and the other polymerization degree was 1,250. This means that the distribution of polymerization degree is so very small as 2.28.

A polymerizable liquid composition was prepared by dissolving 0.07% of an initiator (azobisdimethylvaleronitrile) in this syrup. After deaeration under reduced pressure, the composition was completely polymerized to form a cast sheet using the well-known continuous polymerization equipment having the following structure: Two pieces of mirror-polished stainless steel band (width: 500 mm, thickness: 0.6 mm) were horizontally set up with one upon the other; the horizontal distance of polymerization zone was 10,000 mm, of which the first 6,740 mm corresponded to a heat-polymerization zone heated with 85° C. water, the second 2,170 mm corresponded to a heat treatment zone heated with 120° C. hot air and the last 1,090 mm corresponded to a cooling zone cooled with cool air. The distance between the upper and lower bands was adjusted so that the thickness of cast sheet was 3 mm. The above polymerizable composition was continuously supplied to a space between the bands, and the bands were run at a rate of 374 mm/min so that said composition passed through the heat polymerization zone during 18 minutes. The product had a reduced viscosity of 2.1 dl/g and a monomer content of 0.9%. The product had a good appearance, showing no foaming by polymerization or heating. The heat distortion temperature of this cast sheet was 104° C., and the Izod impact value of the sheet was 8.8 kg.cm/cm. No change in appearance was observed even after 1,000 hour accelerated exposure test, and the retention of impact value was so high as 90% or more.

EXAMPLE 2

A syrup was produced using the same 2-stage continuous reaction equipment as in Example 1. A material liquor prepared by dissolving polybutadiene rubber (3 parts) in a monomer mixture of methyl methacrylate (76 parts) and styrene (14 parts) and a solution of benzoyl peroxide (0.1 part, initiator) in methyl methacrylate (10 parts) were continuously supplied to the vessel-type reactor. Polymerization was carried out while maintaining the average residence time in the vessel-type reactor at 180 seconds, and the temperature and pressure in both reactors at 160° C. and 6 atm., respectively. The resulting syrup had a conversion of 26.4% and a viscosity (25° C.) of 9.0 poises. At that time, the steady-state concentration of initiator in the vessel-type reactor was 1/26 time as much as the concentration of initiator supplied. The initiator content of the final syrup was 0.1 ppm or less, and the average particle size of dispersed particles in the syrup was $0.5\mu$.

A polyerizable liquid composition was prepared by dissolving 0.3% of azobisisobutyronitrile in this syrup. After deaeration under reduced pressure, the composition was injected into a space between two pieces of glass plate. The space was sealed by gasket at each side of the plate, and the distance between the glass plates was maintained so that the thickness of cast sheet was 3 mm. The composition was polymerized at 65° C. for 4 hours, and then polymerization was completed at 120° C. in 2 hours to obtain a cast sheet. The product had a reduced viscosity of 2.7 dl/g and a monomer content of 0.4%. The cast sheet showed no foaming by polymerization or heating, and had a beautiful appearance. The total transmittance of the cast sheet measured according to ASTM D-672 was 92%, and the diffusion percentage was 1.5%, which means that the transparency of the cast sheet is very good. The cast sheet had a heat distortion temperature of 107° C., and an Izod impact value of 5.9 kg./cm/cm. No change in transparency or appearance was observed even after 1,000 hour accelerated exposure test, and the retention of impact value was so high as 90% or more.

EXAMPLE 3

A syrup was prepared in the same manner as described in Example 1. A polymerizable liquid composition was prepared by dissolving methyl acrylate (3 parts), lauroyl peroxide (0.3 part) and lauryl mercaptan (0.3 part) in this syrup (100 parts). This composition was added to a vessel-type reactor equipped with a stirrer together with an aqueous medium prepared by dissolving partially saponified polyvinyl alcohol (Gosenol ® GM-14, a suspension stabilizer produced by Nippon Gosei Kagaku Co.) (0.1 part) in water (150 parts). After the mixture was stirred to make a suspension, it was polymerized at 90° C. for 2 hours with stirring under nitrogen atmosphere, and then polymerization was completed at 110° C. in 30 minutes. After washing and drying, a bead-like polymer was obtained. It had a reduced viscosity of 0.65 dl/g, and a polymer content of 0.4%, and its melt index was 3.1 g/10 min as measured at 210° C. according to JIS K 7210. This bead-like polymer was compression-molded to form a sheet at 210° C. The sheet had a heat distortion temperature of 102° C. and an Izod impact value of 6.5 kg.cm/cm.

EXAMPLE 4

A 1-stage continuous reaction equipment comprising the same stirrer-equipped vessel-type reactor alone as in Example 1 was used. Polybutadiene rubber (5 parts), methyl mathacrylate (100 parts) and azobisdimethylvaleronitrile (0.01 part) was continuously supplied to the reactor. The mixture was polymerized at 160° C. under a pressure of 6 atm. while maintaining its average residence time at 220 seconds. The resulting syrup had a conversion of 10.6% and a viscosity (25° C.) of 12.4 poises. The initiator content of the syrup was 0.2 ppm, and the average particle size of dispersed particles was $0.3\mu$. At that time, the steady-state concentration of initiator in the reactor was 1/320 time as much as the concentration of initiator supplied.

REFERENCE EXAMPLE 1

The same 2-stage continuous reaction equipment as in Example 1 was used. Lauroyl peroxide (1.2 part) and the rubbery polymer and the monomer of the same amounts as in Example 1 were continuously supplied to the vessel-type reactor so that the average residence time in the reactor was 15 minutes. The pressure and temperature in the reactor were kept at atmospheric pressure and 85° C., respectively. Under these reaction conditions, the steady-state concentration of initiator in the reactor was about ⅔ time as much as the concentration of initiator supplied. One hour after the beginning of reaction, the resulting syrup had a conversion of about 20% and a viscosity (25° C.) of about 3 poises. It was very difficult to keep the reaction temperature constant, and it rapidly rised without stopping, and therefore, the polymerization proceeded violently. As a result, the reaction mixture solidified, and it was impossible to continue the reaction.

REFERENCE EXAMPLE 2

A material liquor comprising polybutadiene rubber (5 parts) and methyl methacrylate (100 parts) was added to a vessel-type reactor equipped with a stirrer and a reflux condenser. After heating the liquor to 85° C., azobisdimethylvaleronitrile (0.07 part) was added thereto. The reaction temperature immediately rose by polymerization heat and reached the boiling point after 2 minutes. After the reaction mixture was kept at 100° to 102° C. for 8 minutes, it was cooled by passing cold water through the jacket to obtain a syrup having a conversion of 17.3% and a viscosity (25° C.) of 15.1 poises. This syrup had such properties that the rubbery polymer was dispersed in the form of an irregular layer and that the syrup gradually separated into two phases on standing. This syrup was continuously polymerized to form a cast sheet in the same manner as in Example 1 except that 0.07% of azobisdimethylvaleronitrile was added to the syrup and the syrup was passed through the hot-water polymerization zone in 25 minutes. The product showed white uneven appearance. The product had an Izod impact value so low as 2.1 kg.cm/cm, and caused blushing on standing at room temperature for 1 month owing to that the rubbery polymer separated from the resinous polymer at the interface. Consequently, the cast sheet obtained was of a low commercial value.

EXAMPLE 5

The same 2-stage continuous reaction equipment as in Example 1 was used. An ethylene/vinyl acetate copolymer (Evatate ® R5011, produced by Sumitomo Chemical Co.) (10 parts), methyl methacrylate (100 parts) and benzoyl peroxide (0.1 part) were continuously supplied to the vessel-type reactor. The mixture was polymerized at 160° C. under a pressure of 6 atm. while maintaining its average residence time at 130 seconds. The resulting syrup had a conversion of 24.0% and a viscosity (25° C.) of 30.7 poises. At that time, the steady-state concentration of initiator in the vessel-type reactor was 1/22 time as much as the concentration of initiator sufflied. The initiator content of the final syrup was 0.1 ppm or less, and the average particle diameter of dispersed particles was 3.5µ. A polymerizable liquid composition was prepared by dissolving 0.2% of lauroyl peroxide in this syrup, and polymerized under the same conditions as in Example 1 using the same continuous polymerization equipment as in Example 1. The resulting cast sheet had a reduced viscosity of 2.4 dl/g and a monomer content of 0.7%. The cast sheet showed no foaming by polymerization or heating, and had a good appearance. The cast sheet had a heat distortion temperature of 101° C. and an Izod impact value of 7.2 kg.cm/cm. No change in appearance or impact value was observed even after 1000 hour accelerated exposure test.

What is claimed is:

1. A continuous process for producing a rubber-modified methyl methacrylate syrup, which comprises continuously supplying a material liquor comprising 1 to 20 parts by weight of a rubbery polymer dissolved in 100 parts by weight of a monomer comprising 60 to 100% by weight of methyl methacrylate and 0 to 40% by weight of an ethylenically unsaturated monomer copolymerizable with methyl methacrylate, and a radical-polymerization initiator having a half life period of 5 seconds or less at 180° C. or lower to the first reaction zone wherein the starting materials are substantially completely mixed, continuously polymerizing at such a stationary conversion that the rubbery polymer is dispersed in the form of particles, while maintaining the temperature and residence time in the range of 0.5 to 30 minutes in the zone so that a steady-state is achieved in the zone and the steady-state concentration of the initiator in the reaction mixture is ½ to 1/1,000 time as much as the concentration of initiator supplied, continuously taking out the resulting reaction mixture from the zone, and passing it through the second reaction zone having a volume of 0 to 5 times as much as that of the first reaction zone wherein a piston flow is substantially achieved, and thereby the final concentration of the initiator being decreased to obtain a stable syrup comprising a disperse phase and a continuous phase, the former phase being a solution of a major amount of the rubbery polymer and a minor amount of the resinous polymer in the monomer, the latter one being a solution of a major amount of the resinous polymer and a minor amount of the rubbery polymer in the monomer, the average particle diameter of the disperse phase of the syrup being in the range of 0.1 to 20µ and the number average polymerization degree of resinous polymers in the continuous phase of the syrup being within a range of 300 to 6,000, and the conversion of monomer to polymer of 5 to 40% being achieved.

2. A process according to claim 1, wherein the conversion of the final syrup is 5 to 40% by weight and the viscosity of the syrup is 0.5 to 500 poises at 25° C.

3. A process according to claim 1, wherein the concentration of the initiator in the final syrup is 1 ppm or less.

4. A process according to claim 1, wherein the second reaction zone has a volume of 0.01 to 5 time as much as that of the first reaction zone.

5. A process according to claim 4, wherein the second reaction zone has a volume of 0.02 to 0.5 time as much as that of the first reaction zone.

6. A process according to claim 5, wherein the second zone has a volume of 0.05 to 0.2 times as much as that of the first reaction zone.

7. In a continuous process for producing polymer sheets which comprises continuously supplying a polymerizable liquid composition to one end of a space enclosed by a pair of endless bands, said endless bands being set up so that the lower run of the upper band is positioned above the upper run of the lower band and are travelling in the same direction at the substantially same speed, and said space being sealed with at least one endless gasket which is set up at each side of the endless bands and is travelling in contact with the both bands, passing the composition through the polymerization zone to complete polymerization and taking out the resulting polymer sheet from the other end of the space, the improvement which comprises using a polymerizable liquid composition comprising a syrup produced by any one of claim 1, 2, 3 4, 5 or 6 and a radical-polymerization initiator to obtain a methyl methacrylate cast sheet having an impact resistance.

8. In a cell cast process for producing cast sheet which comprises injecting a polymerizable liquid composition into a mold having a space enclosed by two pieces of glass plate and a gasket between them, heating the composition to complete polymerization, and taking out the resulting resin plate from the mold, an improvement which comprises using a polymerizable liquid composition comprising a syrup produced by any one of claim 1, 2, 3, 4, 5 or 6 and a radical-polymerization initiator to obtain a methyl methacrylate cast sheet having an impact resistance.

9. In a suspension polymerization for producing polymer beads which comprises suspending a polymerizable liquid composition in an aqueous medium, and heating the composition to complete polymerization, an improvement which comprises using a polymerizable liquid composition comprising a syrup produced by any one of claim 1, 2, 3, 4, 5 or 6 and a radical-polymerization initiator to obtain a methyl methacrylate resin molding material having an impact resistance.

10. A rubber-modified methyl methacrylate syrup prepared by the process of any one of claim 1, 2, 3, 4, 5 or 6.

* * * * *